Patented Dec. 9, 1941

2,265,236

UNITED STATES PATENT OFFICE 2,265,236

METHOD OF MAKING MOLDED ARTICLES OF RESIN

Samuel S. Kistler, West Boylston, Mass., assignor, by mesne assignments, to E. I. du Pont de Nemours & Company, Wilmington, Del., a corporation of Delaware No Drawing. Application May 22, 1940, Serial No. 336,583

9 Claims. (Cl. 51—298)

This invention relates to methods of making molded articles of resins. In particular, I propose to make molded bodies of a copolymer of methyl methacrylate and acrylic or methacrylic acid with or without other materials incorporated therein.

Methyl methacrylate and acrylic or methacrylic acid may be copolymerized in all proportions. Each of these acids has the peculiar property of acting as a hardening agent for the polymerized methyl methacrylic and thereby forming a copolymerized resin of great utility. For example, a copolymer of methyl methacrylate with 15% by volume of methacrylic acid has a hardness of 69 to 71 on the Rockwell C scale with a 60 kg. load, ⅛th inch ball, 15 seconds, as compared with a hardness of about 35 to 40 for the methyl methacrylate alone. The compressive strength of the copolymer is 26,000 pounds per square inch, and its tensile strength at room temperature is from 8,000 to 10,000 pounds per square inch. The material softens at about 143° C., and it may be molded by heat and pressure at a temperature of from 130 to 160° C. It is transparent and stable to sunlight and ultraviolet light, and its light absorption in the visible spectrum is negligible. It is not attacked by any of the standard solvents and it has a high electrical resistance and dielectric strength. These resins are tough and strong, and each may be used as a molded body in many arts either by itself or in association with other materials, such as inert fillers, or with other polymerizable substances incorporated therewith. It is particularly useful as a bond for abrasive grains in the production of a grinding wheel. This composition, however, when polmerized sets to a hard and glass like condition and so presents various problems in the production of either a molded body or a grinding wheel made of bonded abrasive grains.

The primary object of this invention is to provide a method of making molded bodies of various types of such a copolymer whereby the previously polymerized material may be rendered plastic and shaped as desired.

A further object is to make grinding wheels and other abrasive articles of a copolymer of methyl methacrylate and acrylic or methacrylic acid and to provide a method whereby abrasive grains may be united rigidly into an integral and strong structure adapted for abrading purposes. Other objects will be apparent in the following disclosure.

In accordance with this invention, I propose to copolymerize methyl methacrylate and acrylic acid or methacrylic acid and form a granular material therefrom and then to wet this granular material with monomeric methacrylic acid or acrylic acid or with a monomeric substance containing either or both of said acids, with or without other polymerizable substances, and to produce therefrom a plastic coherent moldable mass which may be subsequently hardened into a rigid condition by polymerization.

The following procedure may be adopted in the manufacture of a molded article, either with or without other material incorporated therein, such as an inert filler. One suitable composition of a copolymerized resin comprises methyl methacrylate with 15% of methacrylic acid, but the amount of the acid may be varied widely, such as from 1 to 50% or more, with corresponding changes in the properties of the copolymer. The monomeric liquids after mixture may be placed in a mold and polymerized by the application of heat, such as 60° C. for 24 hours; and to accelerate the polymerization, a suitable catalyst, such as 0.03% of benzoyl peroxide, may be added. Thereafter, the material may, if desired, be removed from the mold and again heated in an oven at a temperature of 100° C. to 130° C. for 8 to 12 hours in order to complete the polymerization; but this second heating step is preferably omitted until after the final molded body has been formed. The polymerized material is then crushed into granular form of suitable grit size, such as will pass through a screen of 100 meshes per linear inch. If desired, the powder may be formed initially by polymerizing the copolymers in a solvent for the monomers but which is not a solvent for the polymerized resin, such as kerosene or carbon tetrachloride.

The resin is now ready for use in making a molded body. To a given quantity of the powder, I add a suitable amount, such as 5 to 50% by weight of monomeric methacrylic acid or a mixture containing the same, such as 5 to 50% by weight of a mixture of monomeric methyl methacrylate and 15 to 50% of methacrylic acid. This addition is preferably carried on while the mass is stirred in a mixing machine made of suitable material, where the acid mixture will dissolve the surface portion of the resin particles and ultimately work it up into a doughy mass. The temperature is preferably held below that at which polymerization takes place. The consistency of this dough may be varied by changing the proportions of the dry grains and the liquid monomeric mixture. Also, I may use methacrylic or acrylic acid alone as the solvent in any suitable proportions. After the dough has been formed, it may be then shaped in a mold with or without high pressure and/or heat and again subjected to heat, such as 60° C., for several hours sufficient to polymerize the monomeric substance. The methacrylic acid mixture added for this purpose may also contain a slight amount of benzoyl peroxide, such as 0.02% by volume, or other suitable catalyst, in order to hasten the polymerization. After the article has been shaped in a mold, it may be fully polymerized in the mold, or it may be removed therefrom after it has set and then be placed in an oven where it is raised to a temperature of 100° C. or more for the purpose of completing the polymerization of both the plasticizing monomer and the copolymerized substances which form the resin.

It is to be understood that any well known and suitable procedure may be adopted for polymerizing the resin substances and for making molded articles therefrom. For example, polymerization may be effected or aided by the action of light. Also, the molding may be carried on in a hydraulic press where the mass is subjected to a suitable pressure, such as 1 ton per square inch, more or less, depending on the porosity, shape or structure required. Likewise, various other polymerizable substances may be included in the copolymer resin or in the plasticizing monomeric liquid, such as styrene or other unsaturated methylene compound, which are compatible and miscible with the monomer and will form a copolymer therewith.

The above procedure may be adopted for making an abrasive article, such as a grinding wheel. For example, after the copolymer of acrylic acid or methacrylic acid with methyl methacrylate has been made and provided in a granular form, the resin powder may be incorporated with the abrasive grains in suitable proportions, such as 12 to 30 percent by weight of bond. The abrasive grains may be first wetted with the acrylic or methacrylic acid monomer or a monomeric liquid containing the acid with another polymerizable substance, such as methyl methacrylate; or the resin powder may be wetted with this material initially; or the two dry substances may be placed in a mixing kettle and the monomeric liquid added to both of them, while the materials are being mixed together.

The acid wets the resin grains in any case and produces a plastic and doughy mass having the abrasive grains incorporated uniformly throughout the same. If the grains are first mixed with the acid, then the resin particles should preferably be of smaller size than the abrasive grains, so that the resin will form a powdered coating on the individual abrasive grains. Due to the solvent action of the acid, the surfaces of the resin particles will become sticky or tacky and thus adhere to the abrasive grains. The same condition is obtained if the resin grains are mixed with the acid before the abrasive grains are incorporated therewith. The preferred procedure is to wet the resin with methacrylic acid or a mixture containing the same and to make a dough, and then to incorporate the dry abrasive grains therein by means of a mixing machine or by rolling the grains into the dough by repeatedly passing the dough through calendaring rolls of suitable material and intermittently sprinkling abrasive grains thereon.

After the abrasive grains have been satisfactorily, and preferably uniformly dispersed throughout the resin dough, the mass may be then removed and placed in a mold and there subjected to pressure, if desired, in order to form a molded article. The pressure may be varied to control the porosity or structure of the article to be formed. The structure or the porosity will also be determined by the relative proportions of the resin and the abrasive grains. The preferred molding procedure is to employ precalculated amounts of resin and grains and to compact them in a mold under a pressure which will provide the required porosity. This may be done as is set forth in the patent to Howe and Martin No. 1,983,082 of December 4, 1934.

The molded mass may be heated to polymerize the methacrylic acid mixture while it remains in the mold and under pressure; or the pressed article may be removed from the mold and then be subjected to heat in an oven either with or without confining plates attached thereto to maintain its shape. The molded mass may be heated at a temperature either below or above the softening point thereof.

The different types of abrasive grain, such as crystalline alumina, silicon carbide, boron carbide, tungsten carbide and diamond, as well as garnet, quartz and the like, may all be bonded by means of this bonding substance. The grit size of the abrasive may be as desired. Likewise, the molded bodies may contain inert material, such as clay, asbestos, sand and the like, in order to make a stronger body or to impart other desired physical characteristics thereto, or to cut down the amount and cost of the resin employed in the article.

It will now be appreciated that the above description of my invention is to be considered as illustrative of the general principles of the invention and of preferred embodiments thereof but not as limitations on the claims appended hereto.

I claim:

1. The method of making a molded article comprising the steps of providing a powdered copolymer containing methyl methacrylate and a substance selected from the group consisting of acrylic acid and methacrylic acid, wetting the resin particles with a monomeric liquid containing an acid selected from the group consisting of the acrylic and methacrylic acids and forming a plastic mass, and thereafter shaping the mass and polymerizing the monomeric substance to form a completely polymerized body.

2. The method of making a molded article comprising the steps of providing a copolymer containing methyl methacrylate and methacrylic acid in granular form, wetting the same with a monomeric substance comprising methacrylic acid and forming a plastic mass, shaping the mass and heating the same to polymerize the monomeric substance present.

3. The method of making a molded article comprising the steps of providing a copolymerized resin containing methyl methacrylate and methacrylic acid in granular form, wetting the resin powder with a monomeric substance comprising methyl methacrylate and methacrylic acid and forming a plastic dough thereof, shaping the mass and subjecting the same to heat and polymerizing the same.

4. The method of making an abrasive article comprising the steps of incorporating abrasive grain with a resin powder comprising methyl methacrylate and methacrylic acid and a monomeric liquid comprising an acid selected from the group consisting of acrylic acid and methacrylic acid and mixing the materials to form a plastic mass in which the abrasive grains are incorporated throughout the same, thereafter shaping the mass and heating it to polymerize the monomeric substance and form an integral structure.

5. The method of making a bonded article of granular material comprising the steps of mixing abrasive grains with a monomeric liquid selected from the group consisting of acrylic acid and methacrylic acid, incorporating with the wet grains a quantity of resin powder formed of copolymerized substances including methyl methacrylate and a substance selected from the group consisting of the acrylic and methacrylic acids, mixing the same and forming a plastic mass at a temperature below that at which polymerization takes place, thereafter shaping the plastic mass and heating the same to polymerize the monomeric substance and form an integral article of bonded abrasive grains.

6. The method of making an abrasive article comprising the steps of mixing abrasive grains with a resin powder comprising methyl methacrylate copolymerized with methacrylic acid and with a monomeric liquid comprising methacrylic acid in amount sufficient to dissolve the surfaces of the resin powder and form a plastic doughy mass, mixing the materials to distribute the brasive grains throughout the dough, shaping an article therefrom and thereafter heating the mass at a temperature above the softening point of the resin and polymerizing the monomeric substance and subsequently cooling the same.

7. The method of making a bonded abrasive article comprising the steps of providing a resin powder comprising a polymerized substance including methyl methacrylate and an acid selected from the group consisting of the acrylic and methacrylic acids, wetting the powder with a monomeric liquid substance comprising one of said acids and forming a plastic dough, incorporating abrasive grains in the dough, shaping an article therefrom and heating the article to polymerize any monomeric substance present and bond the abrasive grains.

8. The method of making an abrasive article comprising the steps of heating and partially polymerizing a monomeric substance comprising methyl methacrylate and an acid selected from the group consisting of the acrylic and methacrylic acids and forming a solid resin in a powdered condition, wetting the powder with a monomeric substance including one of said acids and forming a dough, incorporating abrasive grains in the dough while it comprises a monomeric substance, shaping an article therefrom, and heating the mass to polymerize the monomeric substances present and complete the polymerization of said resin.

9. The method of making an abrasive article comprising the steps of heating and partially polymerizing a monomeric substance comprising methyl methacrylate and an acid selected from the group consisting of the acrylic and methacrylic acids and forming a solid resin powder, wetting the resin powder with a monomeric substance including one of said acids and forming an adhesive dough, incorporating abrasive grains in the dough while it comprises a monomeric substance, shaping an article therefrom and heating the article to a temperature at which the resin is soft and polymerizing the monomeric substance and finally cooling the mass and providing an integral hard mass of resin bonded abrasive grains.

SAMUEL S. KISTLER.